(12) United States Patent
Chuah

(10) Patent No.: US 6,839,339 B1
(45) Date of Patent: Jan. 4, 2005

(54) HEADER COMPRESSION FOR GENERAL PACKET RADIO SERVICE TUNNELING PROTOCOL (GTP)-ENCAPSULATED PACKETS

(75) Inventor: Mooi Choo Chuah, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/497,002

(22) Filed: Feb. 2, 2000

(51) Int. Cl.[7] .................................................. H04J 3/24
(52) U.S. Cl. ........................ 370/349; 370/477; 370/521
(58) Field of Search ................................ 370/467, 521, 370/474, 477, 349, 392, 405, 475, 389, 351–356, 465, 566; 709/247, 237; 375/240

(56) References Cited

U.S. PATENT DOCUMENTS

| | | | | |
|---|---|---|---|---|
| 6,032,197 A | * | 2/2000 | Birdwell et al. ............ | 709/247 |
| 6,104,929 A | * | 8/2000 | Josse et al. ................. | 455/445 |
| 6,233,458 B1 | * | 5/2001 | Haumont et al. ........... | 455/445 |
| 6,314,095 B1 | * | 11/2001 | Loa ............................. | 370/352 |
| 6,434,168 B1 | * | 8/2002 | Kari ............................ | 370/521 |
| 6,438,108 B1 | * | 8/2002 | Kanljung et al. ........... | 370/249 |
| 6,469,998 B1 | * | 10/2002 | Burgaleta Salinas et al. .............. | 370/338 |
| 6,542,504 B1 | * | 4/2003 | Mahler et al. .............. | 370/392 |
| 6,594,280 B1 | * | 7/2003 | Chapman .................... | 370/469 |
| 6,608,841 B1 | * | 8/2003 | Koodli ........................ | 370/474 |

OTHER PUBLICATIONS

ETSI TS 129 060, v.3.3.0 (3G TS 29.060 V.3.3.0 Release 1999) GRPS, GTP across the Gn and Gp Interface.*

S. Casner and V. Jacobson, "Compressing IP/UDP/RTP Headers for Low–Speed Serial Links", IETF FRC2508, Feb. 1999.

L. Jonsson, M. Degermark, H. Hannu, and K. Svanbro, "Robust Checksum–based Header Compression", IETF internet draft, Oct. 1999.

T. Koren, P. Ruddy, B. Thompson, A Tweedly, and D. Wing, "Tunneled multiplexed Compressed RTP (TCRTP)", IETF internet draft, Jun. 25, 1999.

W. Delylle, "GPRS and PDNs Interconnection Issues", Online! Aug. 1998, pp 1–78.

Degermark et al, "Low–Loss TCP/IP Header Compression for Wireless Networks", Wireless Networks, US, ACM, vol. 3, No. 5, Oct. 1, 1997, pp. 375–387.

* cited by examiner

Primary Examiner—Ajit Patel
(74) Attorney, Agent, or Firm—Matthew J. Hodulik

(57) ABSTRACT

A UMTS (Universal Mobile Telecommunications System) core network supports a compression framework that provides for header compression of General Packet Radio Service Tunneling Protocol (GTP)-Encapsulated Packets. In particular; the GTP/UDP(User Datagram Protocol)/IP (Internet Protocol) header is compressed. In addition, the UMTS core network also supports RTP(Real Time Protocol)/UDP/IP header compression independent of the GTP/UDP/IP header compression.

14 Claims, 16 Drawing Sheets

IPv4 Header

UDP Header

Compressed GTP Header

HEADER COMPRESSION FOR GENERAL PACKET RADIO SERVICE TUNNELING PROTOCOL (GTP)-ENCAPSULATED PACKETS

CROSS-REFERENCE TO RELATED APPLICATIONS

Related subject matter is disclosed in the, commonly assigned, U.S. patent application of Yang, entitled "Method And Apparatus For Telecommunications Using Internet Protocol," application Ser. No. 09/344781, filed on Jun. 25, 1999.

FIELD OF THE INVENTION

This invention relates generally to communications and, more particularly, to packet communications systems.

BACKGROUND OF THE INVENTION

As wireless systems continue to evolve, communications between a mobile switching center (MSC) and its base stations are moving to an Internet Protocol (IP) based transport mechanism. (As used herein, the term wireless systems refers to e.g., CDMA (code division multiple access), GSM (Global System for Mobile Communications), the proposed UMTS (Universal Mobile Telecommunications System), etc.) Given the nature of wireless communications, e.g., real-time voice, any IP-based transport needs to utilize a protocol that accommodates real-time applications.

One such protocol is the Real Time Protocol (RTP) (e.g., see H. Schulzrinne, R. Frederick, V. Jacobson, "*RTP: A Transport Protocol for Real-Time Applications*," RFC 1889). RTP is attractive since it is an available Internet Engineering Task Force (IETF) protocol for handling real-time streams. RTP traffic is encapsulated in UDP (user datagram protocol), and IP packets.

Unfortunately, the use of RTP/UDP/IP generates a large overhead when voiceover-IP applications are run over wireless networks since the voice payload is usually small (e.g. 10 to 20 bytes) while the RTP/UDP/IP header is 40 bytes.

SUMMARY OF THE INVENTION

Besides the large overhead associated with RTP/UDP/IP headers, this situation is further aggravated by the use of General Packet Radio Service Tunneling Protocol (GTP)-Encapsulated Packets. In this case, the GTP/UDP/IP overhead is about 980% with a voice payload of 10 bytes. Therefore, and in accordance with the invention, the GTP/UDP/EP header is compressed for transmission.

In an embodiment of the invention, a UMTS core network supports a compression framework that provides for compression of a GTP/UDP/IP header (referred to herein as "GTP header compression" or a "compressed GTP header"). In addition, the UMTS core network also supports RTP/UDP/IP header compression (referred to herein as "RTP header compression" or a "compressed RTP header") independent of the GTP header compression. As a result, the UMTS core network is able to more efficiently transport small multimedia RTP packets.

DETAILED DESCRIPTION

Figure 1:
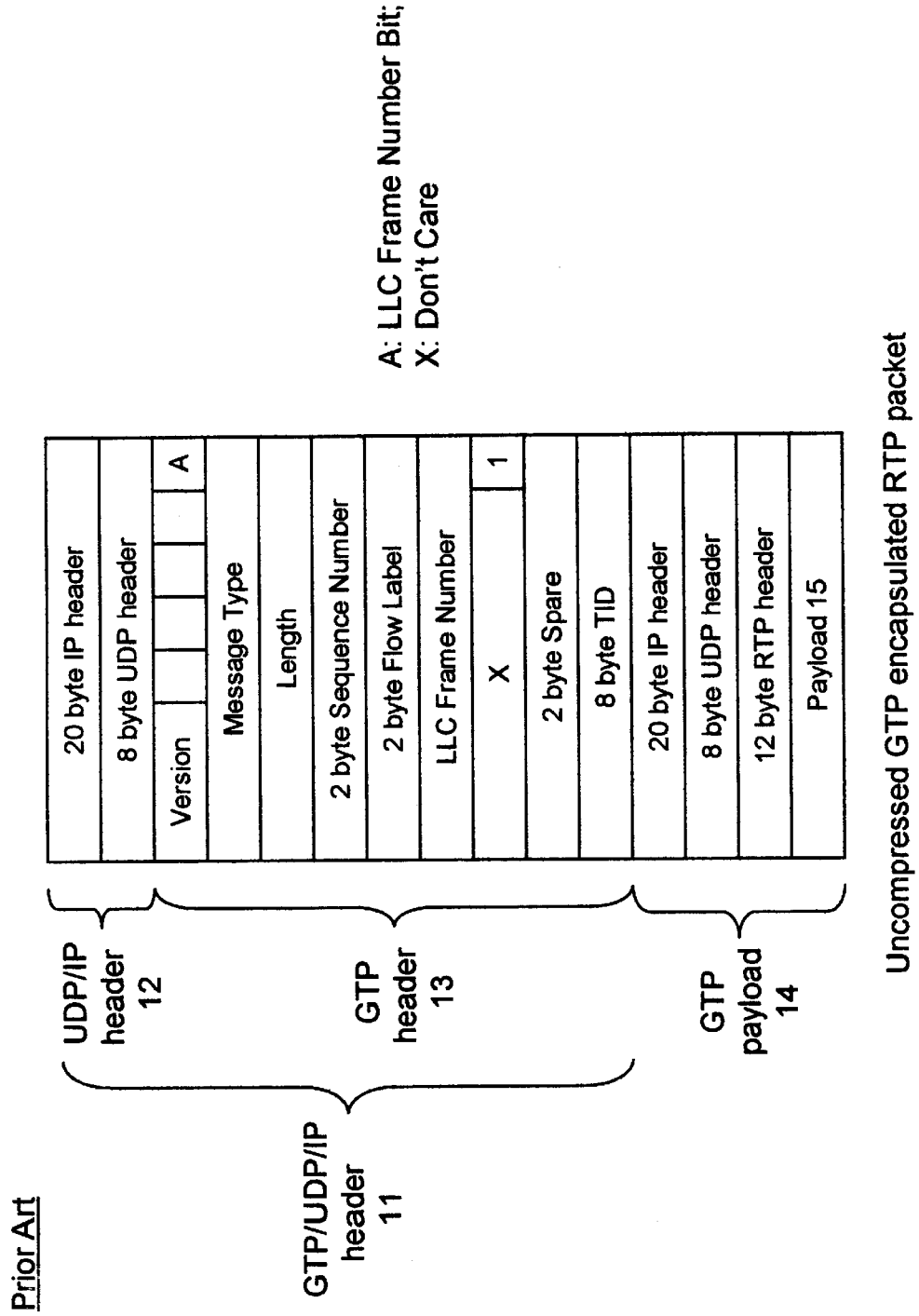
FIG. 1 shows a prior art uncompressed GTP encapsulated RTP packet.

An illustrative format of an uncompressed GTP encapsulated RTP packet 10, as known in the art (release 97 version), is shown in FIG. 1. The GTP/UDP/IP header 11 comprises an IP/UDP header 12 and a GTP header 13. The GTP/UDP/JP header 11 sits on top of GTP payload 14 as known in the art. With a voice payload illustratively equal to 10 bytes (e.g., payload 15 of FIG. 1), this results in an overhead of about 980% as a result of the GTP/UDP/IP header 11. Therefore, and in accordance with the invention, the GTP/UDP/IP header is compressed for transmission. It can be observed from FIG. 1 that GTP payload 14 also transports an IP header and a UDP header. As known in the art, IP/UDP header 12 comprises origination and destination information with respect to the tunnel, while the IP header and UDP header of GTP payload 14 comprises origination and destination information with respect to the communications endpoints. (It should be noted that the TID value is based upon the release 97 version as defined in Global System for Mobile Communications (GSM) 04.08 document, Digital cellular telecommunications system (Phase 2+); mobile radio interface layer 3—specification, The TID value includes 8 bytes: 12 bits MCC, 8 bits MNC, 40 bits MSIN and 4 bits NSAPI. The MCC, MNC, MSIN and NSAPI are parts of the IMSI defined in the GSM 04.08 document.)

Figure 2:
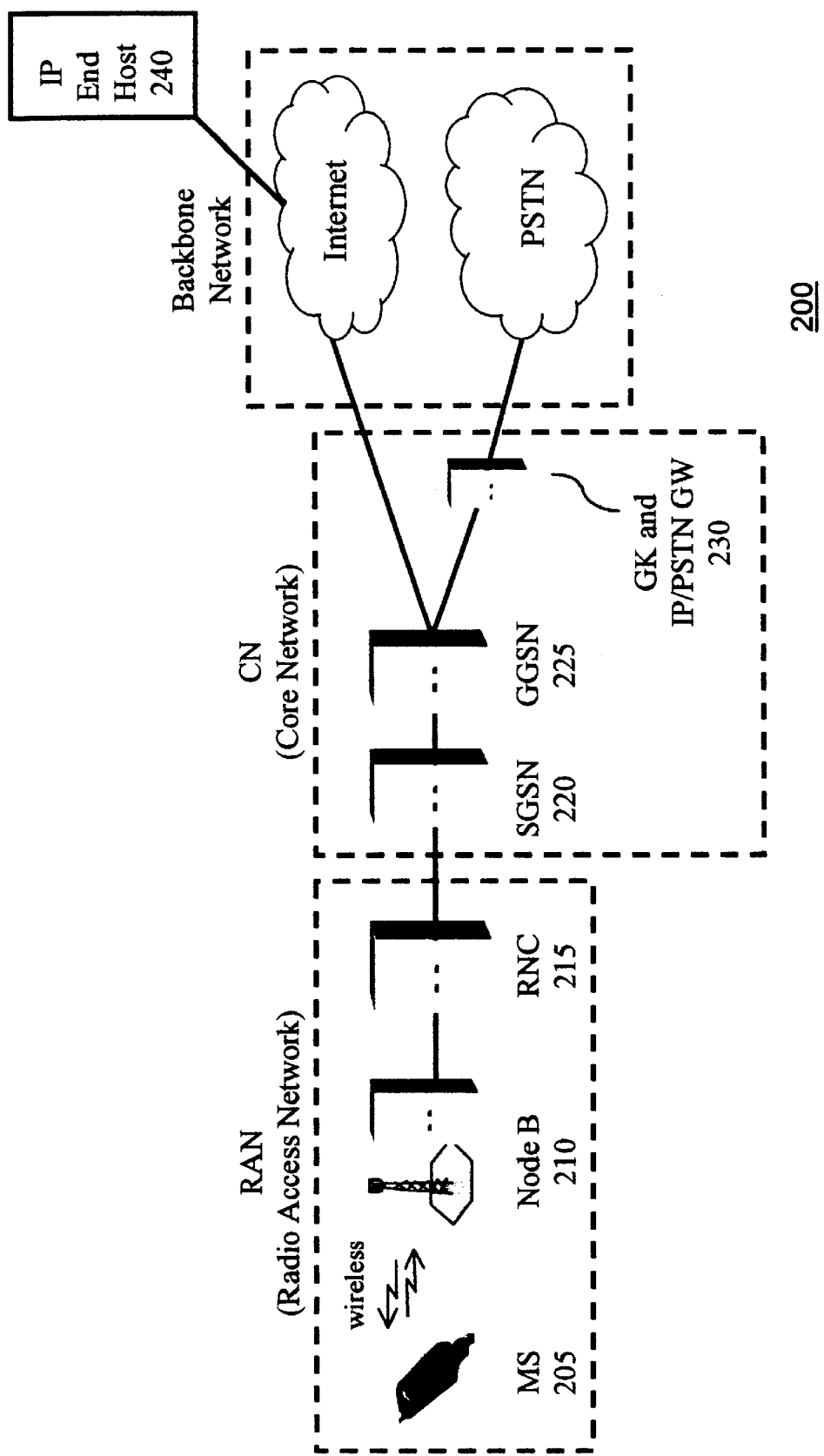
FIG. 2 shows a UMTS network embodying the principles of the invention.

An illustrative UMTS network 200 modified in accordance with the principles of the invention is shown in FIG. 2. Other than the inventive concept, the elements shown in FIG. 2 are well known and will not be described in detail. For example, UMTS network 200 comprises a radio access network (RAN), a core network (CN), a backbone network, and an illustrative endpoint represented by IP End Host 240. The backbone network comprises the Internet and the public switched telephone network (PSTN). The RAN comprises mobile station (MS) 205, node B 210 and radio network controller 215. (Although UMTS uses the term "node B," this is also referred to as a base station.) The CN comprises a serving GPRS support node (SGSN) 220, gateway GPRS support node (GGSN) 225 and element 230, which comprises a gatekeeper (GK) (a component in ITU H.323) and an IP/PSTN gateway (GW) (for translation between H.323 and the PSTN). Although shown as single block elements, the elements of UMTS network 200 include stored-program-control processors, memory, and appropriate interface cards (not shown). For the purposes of this description, an illustrative end-to-end connection is between MS 205 and IP End Host 240 (which are also referred to as endpoints). The term "packet server" as used herein refers to any packet processor, illustrations of which are the above-mentioned elements of UMTS 200.

In accordance with the invention, UMTS network 200 supports a compression framework that provides for GTP header compression. In addition, UMTS network 200 also supports RTP header compression independent of the GTP header compression. (As used herein the terms "GTP header compression" or "compressed GTP header" refer to compression of a GTP/UDP/IP header. Similarly, the terms "RTP header compression" or "compressed RTP header" refer to compression of an RTP/UDP/IP header.) Since GTP header compression is independent from RTP header compression, the GTP peers can be different from the RTP peers (but this is not required). This also provides some design flexibility since some multimedia traffic may not use RTP but purely UDP encapsulation. As a result, UMTS network 200 is able to more efficiently transport small multimedia packets. The description of the inventive concept continues below.

Overview of Header Compression

It should be understood that, in accordance with the invention, RTP header compression and GTP header compression can be negotiated independently between peers (described further below). Other than the inventive concept, compression/decompression techniques are well-known and will not be described herein. For example, typically a compressor/decompressor is a software module stored in a memory (not shown), e.g., of MS 205, and executed by a stored-program-controlled microprocessor (not shown), e.g., of MS 205. The software module uses conventional programming techniques, which, as such, will also not be described herein, to store shared information (described below) and format for transmission compressed, or reduced, forms of a GTP/UDP/IP header or an RTP/UDP/IP header (described below).

Figure 3:
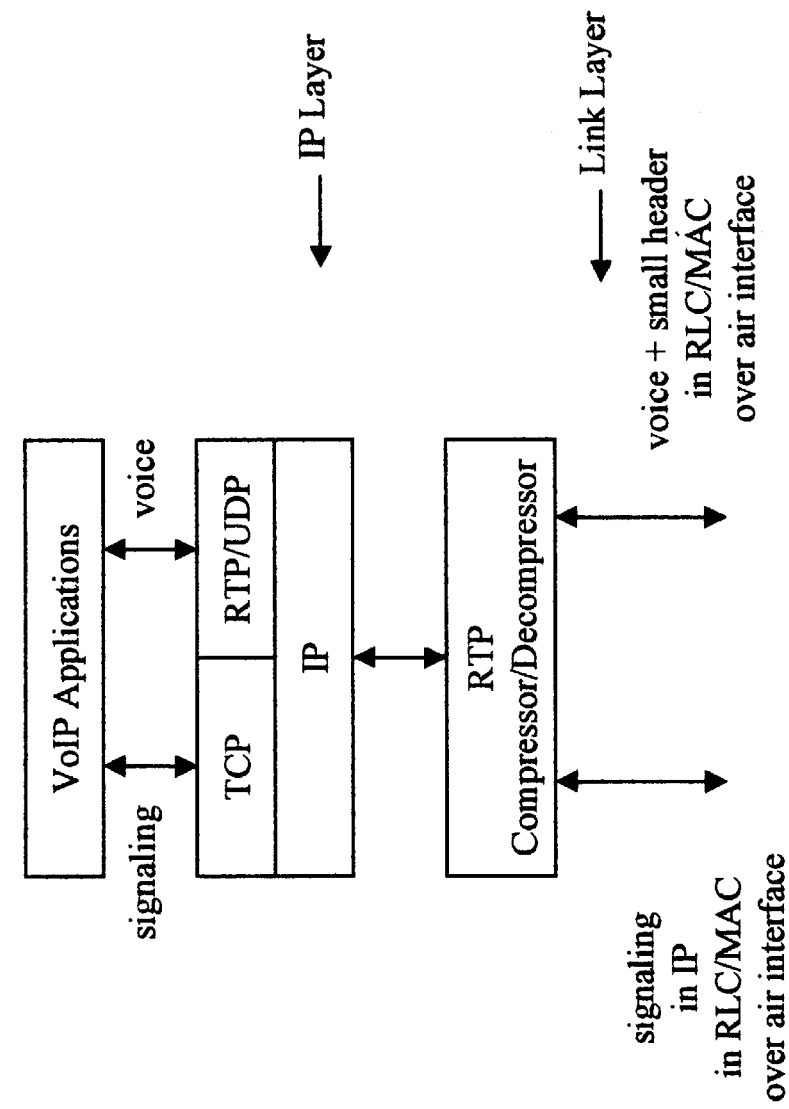
FIGS. 3 and 4 show illustrative protocol stacks for use in a mobile station.
Figure 4:
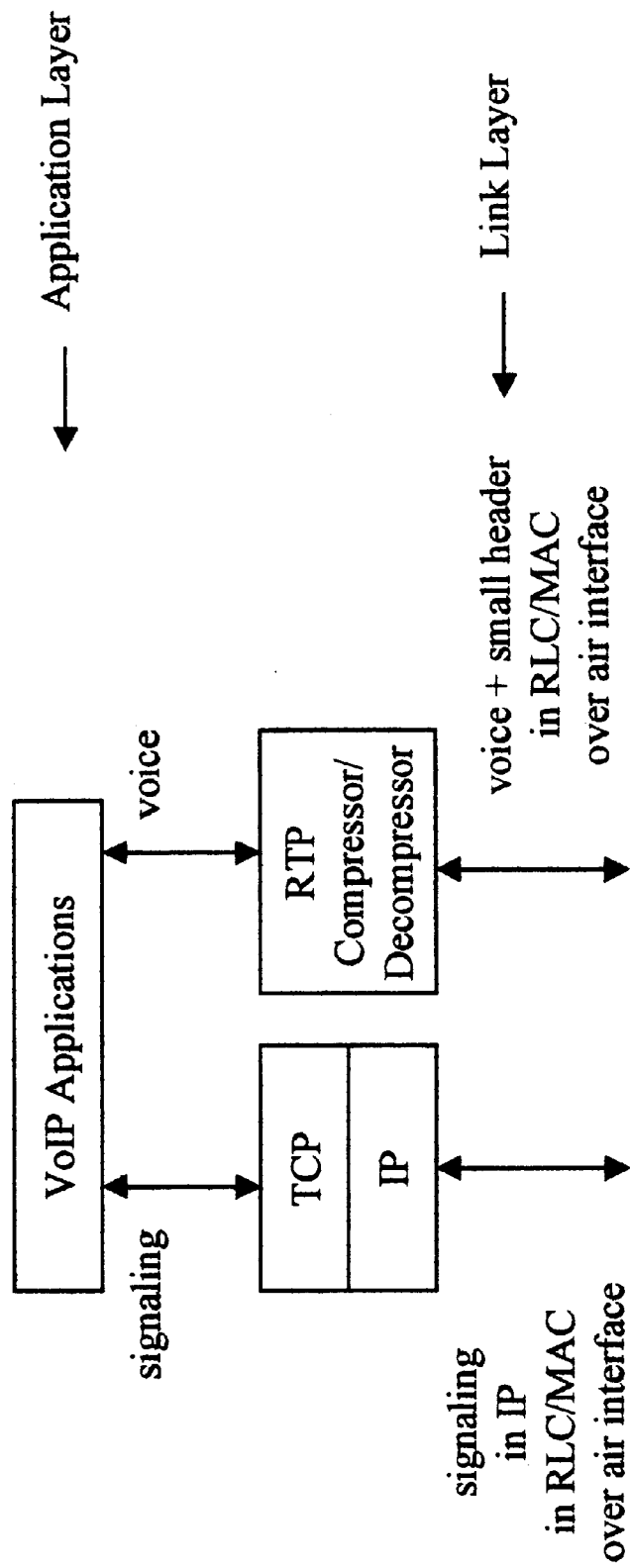
Figure 13:
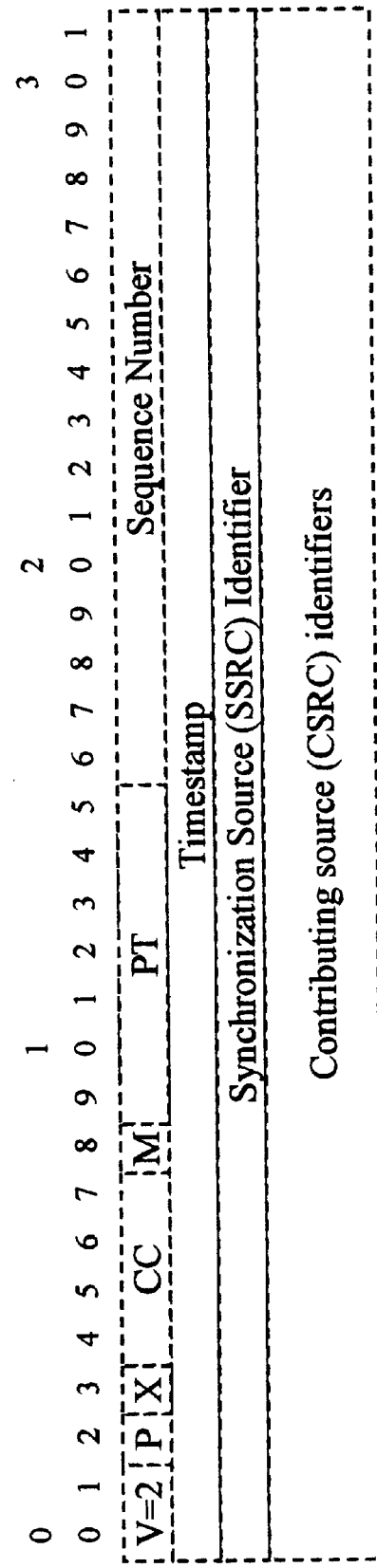

With respect to the mobile station, e.g. MS 205 of FIG. 2, two illustrative protocol stacks comprising a compressor/decompressor are shown in FIGS. 3 and 4. In the protocol stack of FIG. 3, the RTP compressor/decompressor is located between the IP layer and the RLC/MAC (radio link control/media access control) link layer. (For simplicity, the physical layer of the protocol stack is not shown.) In the protocol stack of FIG. 4, the RTP compressor/decompressor is located between the application layer and the RLC/MAC link layer. (Again, the physical layer is not shown.) (Although a form of RTP header compression is described below, it should be noted that the embodiment of FIG. 4 also represents that form of RTP header compression in which an RTP header is simply stripped off in its entirety (an RTP header is illustrated in FIG. 13).)

Figure 5:
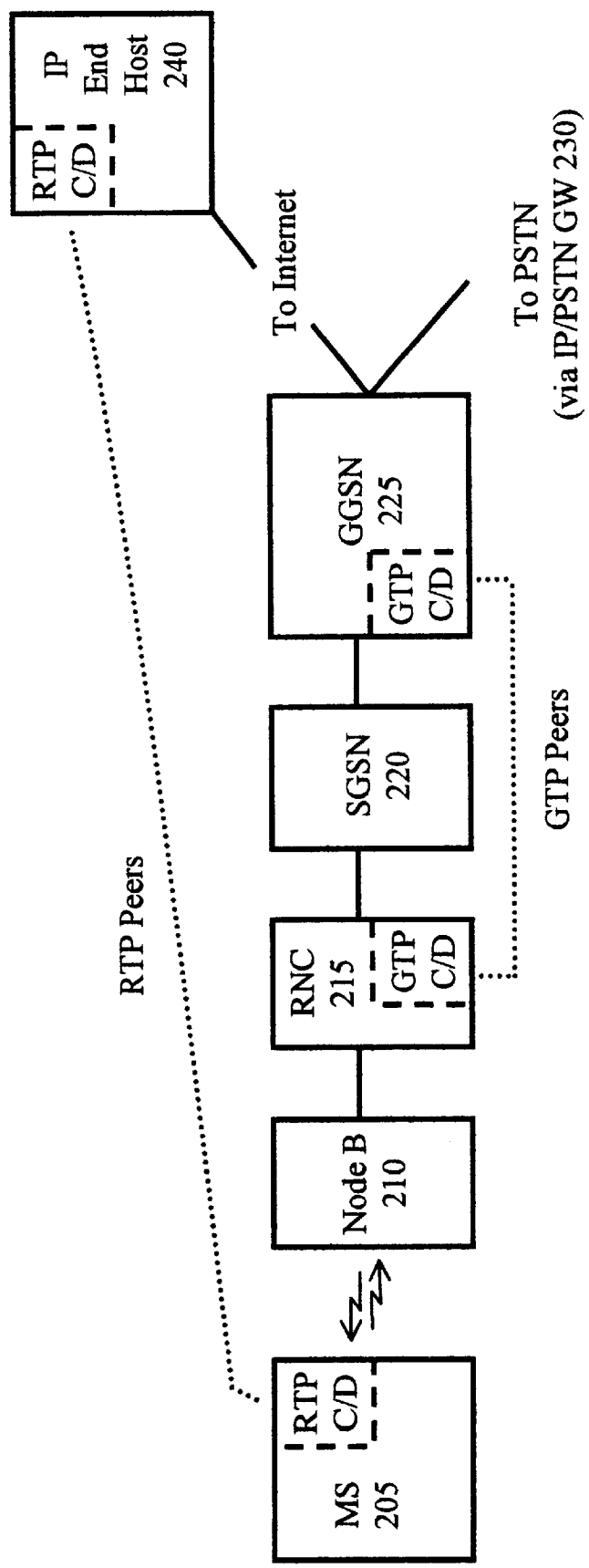
FIG. 5 shows illustrative compressor/decompressor locations in the UMTS network of FIG. 2.

In a complementary fashion, a corresponding RTP compressor/decompressor and GTP compressor/decompressor are located in the UMTS network. An illustrative view of the location of the RTP compressor/decompressor and the GTP compressor/decompressor in UMTS network 200 is shown in FIG. 5. In FIG. 5, the RTP compressor/decompressor (C/D) is located in MS 205 and IP end host 240 (i.e., MS 205 and IP end host 240 are RTP peers), while the GTP compressor/decompressor (C/D) is located in RNC 215 and GGSN 225 (i.e., RNC 215 and GGSN 225 are GTP peers).

RTP is a point-to-point protocol. As such, for RTP header compression peers, it should be noted that this assumes that a link layer identifier (ID) is mapped to each RTP session identifier. One illustrative RTP session identifier comprises the IP destination address and the IP destination port number (these are of the endpoints), the SSRC identifier (e.g., see FIG. 13), and the UDP destination port (e.g., see FIG. 12). If ATM (asynchronous transfer mode) is used as transport, an illustrative link layer ID is the associated VPI/VCI (Virtual Path Identifier/Virtual Connection Identifier). The mapping of the link layer ID and the RTP session occurs within each RTP peer.

It should also be noted that an RTP compressor/decompressor can alternatively be put in the radio access network, e.g., in RNC 215, or even in the core network, e.g., at SGSN 220.

Within the core network, it is preferable (though not required) to put the GTP compressor/decompressor in GGSN 225. If the GTP compressor/decompressor is located in SGSN 220, handovers (also known in the art as "handoffs") due to SRNS (Serving Radio Network Subsystem) relocation may still have to be accounted for. (As known in UMTS, an SRNS includes not only a particular RAN but also supporting elements, e.g., a data base (not shown).) However, with the GTP compressor/decompressor located at GGSN 225, no context transfer is required even for the case of SRNS relocation.

Turning now to FIGS. 6–10, illustrative message flows for using GTP header compression and RTP header compression in UMTS network 200 are shown. Other than the inventive concept, the description that follows utilizes well-known UMTS message flows, which are not described herein. In FIGS. 6–10 it is assumed that the GTP header peers are RNC 215 and GGSN 225, while the RTP header peers are MS 205 and IP End Host 240.

Figure 6:
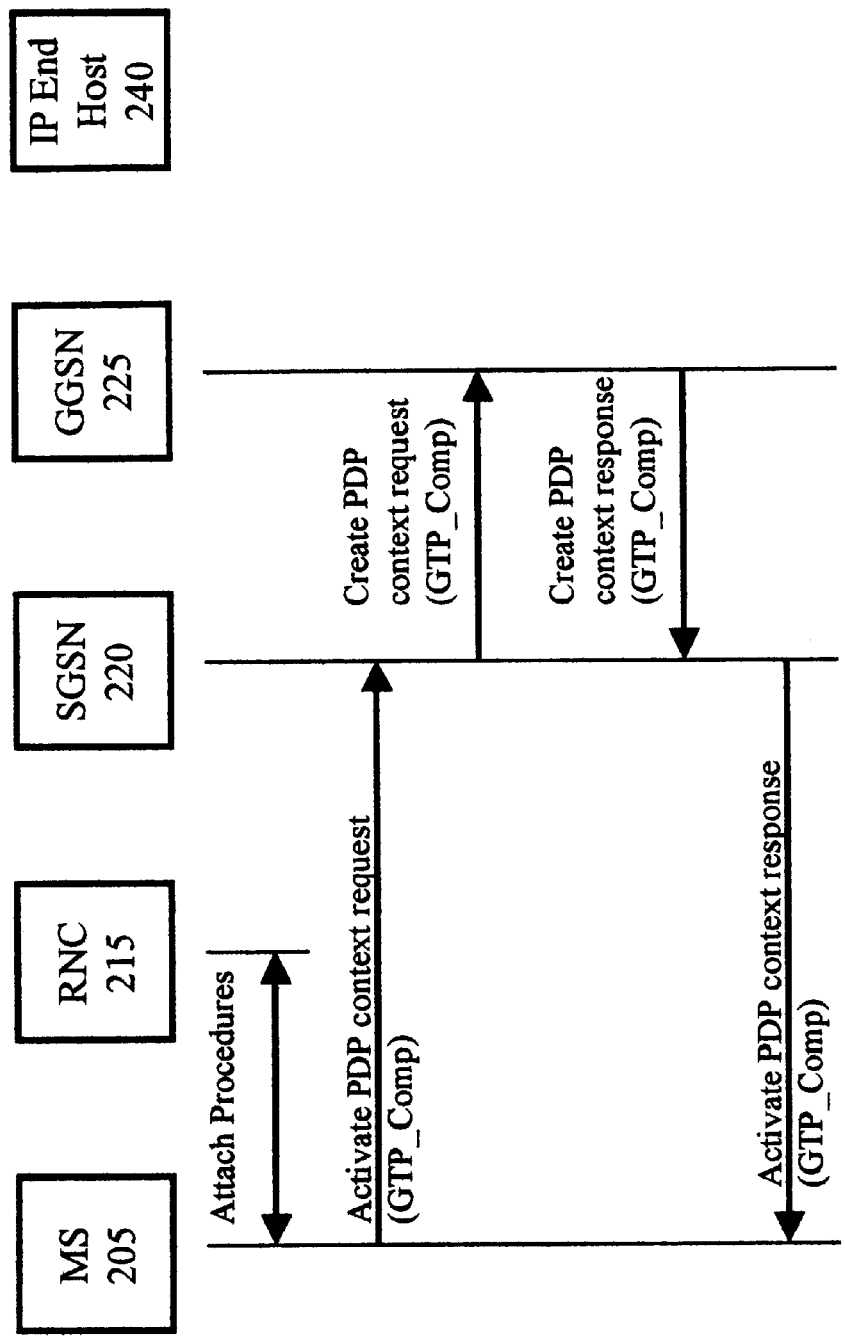
FIGS. 6–10 show illustrative message flows.

FIG. 6 illustrates how a mobile station, e.g., MS 205 of FIGS. 2 and 5, negotiates GTP header compression/decompression. After the "Attach Procedures" are performed between MS 205 and RNC 215 (as known in the art), MS 205 transmits to SGSN 220 an "Activate PDP (packet data protocol) context" request message modified, in accordance with the invention, to include a GTP header compression request represented by a predefined identifier designated as "GTP_Comp." In response, SGSN 220 sends a "Create PDP context" request message (modified to include the "GTP_Comp" identifier) to GGSN 225 to signify a request for GTP header compression. GGSN 225 responds with a "Create PDP context" response message as an acknowledgment (modified to include the "GTP_Comp" identifier). Upon receipt of the "Create PDP context" response message, SGSN 220 sends an "Activate PDP context" response message (modified to include the "GTP_Comp" identifier) to MS 205.

As noted above, in order to establish a GTP header compression context, either a GTP Compressed flag (e.g., a predefined bit pattern) or a GTP Header Compression Context Information Element (IE) is added to the existing message set. This GTP Header Compression_Context EE will comprise the GTP full header information. If this element is present, one need not send a full GTP header to establish the GTP header context. Otherwise, one may need to send one or more packets with full GTP header to establish GTP header context. (It should be noted that for the case where the GTP compressor/decompressor is located at an SGSN, and an SRNS relocation occurs resulting in a change of SGSN, the new SGSN can send a GTP context enquiry message to the old SGSN and the old SGSN can reply with the appropriate GTP context response message so that the new SGSN can now be the new compressor/decompressor point for GTP header compression.)

Figure 7:
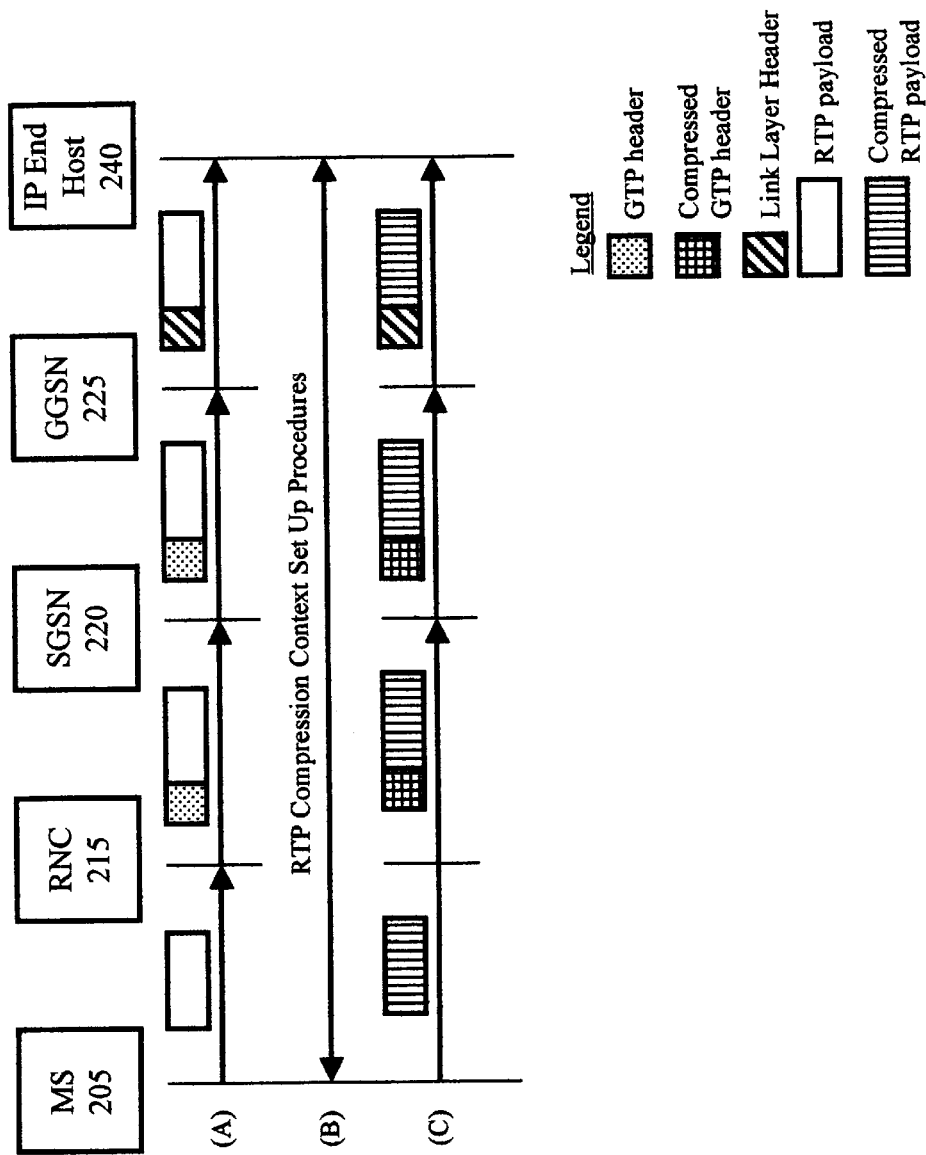

Turning now to FIG. 7, illustrative packet flows are shown. For GTP header compression, at least one packet with a full GTP header is sent to establish the GTP compressed header context (FIG. 7, (A)) between the GTP peers (here, represented by RNC 215 and GGSN 225). As noted, packets are communicated using GTP between GGSN 225 and RNC 215 (i.e., GTP terminates at GGSN 225 and RNC 215). Once the GTP header compression is negotiated, each GTP peer, e.g., GGSN 225 formats data packets in accordance with GTP and then compresses the GTP header before transmitting the packets (described below) to its GTP peer, here RNC 215, which uncompresses the GTP header and recovers the payload (which may or may not include RTP) for transmission to MS 205. Similarly, in the other direction, RNC 215 compresses the GTP header for transmission to GGSN 225, which uncompresses the GTP header and recovers the payload. Packets are communicated between GGSN 225 and IP End Host 240 with a link layer header as known in the art. Subsequent to GTP header compression negotiation, RTP header compression may optionally be negotiated between MS 205 and IP End Host 240 (FIG. 7, (B)) in a similar fashion as that shown for the GTP header compression negotiation of FIG. 6.

Figure 8:
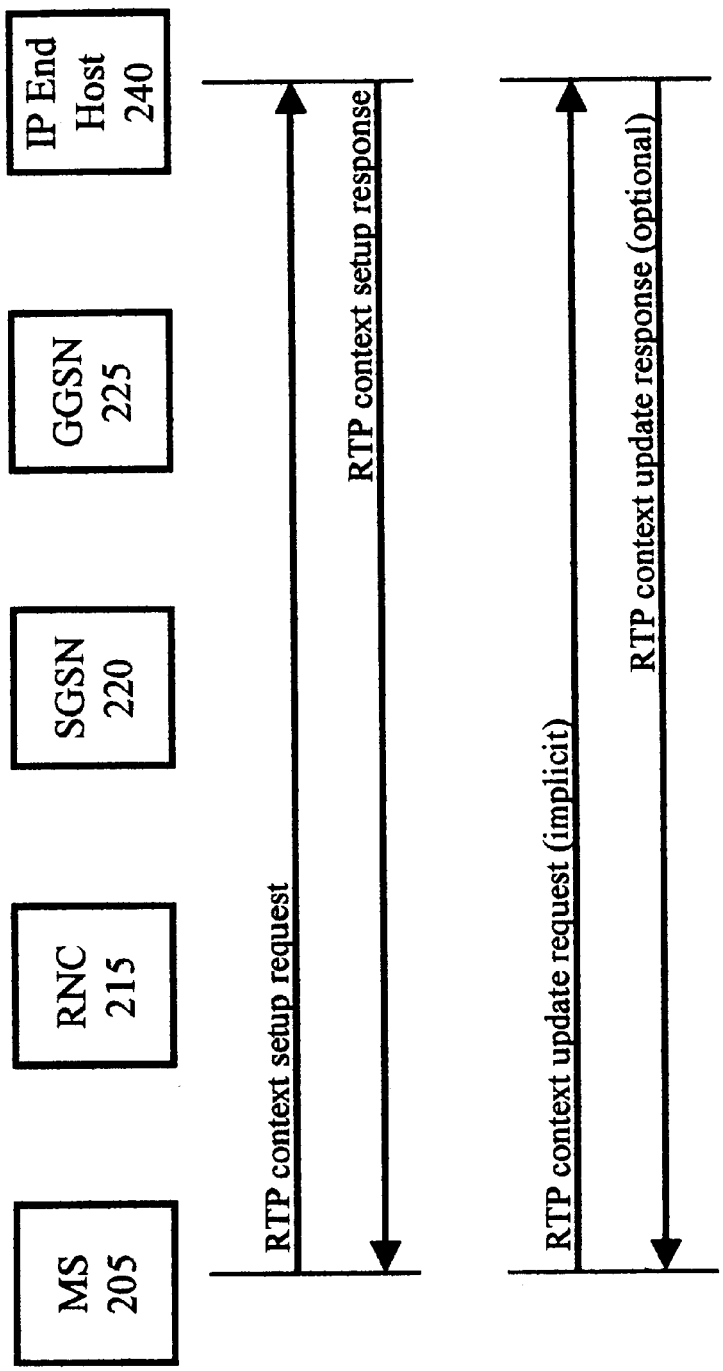

Illustrative RTP header compression context message exchanges are shown in FIG. 8. (Again, modification of existing signaling messages are assumed. As such predefined bit values are added to existing message sets to identify the additional message requirements, e.g., that this is an "RTP context set up" message.) Initially, two RTP peers exchange signaling messages to set up the RTP header compression context. An "RTP context set up" request message is sent from one RTP peer, e.g., MS 205, to the other RTP peer, e.g., IP End Host 240. An "RTP context Set up" response message completes the handshake. Whenever there is a change in the RTP context, the appropriate context update code is used in the first byte of the compressed RTP header (described below) to indicate the additional changed (or delta) information carried within the RTP compressed header. Thus, an "RTP context update" request message is an implicit message in the RTP compressed header. However, an "RTP context update" response message is optional. (It should be noted that the RTP header compression between the two RTP peers (here represented by MS 205 and IP End Host 240) can exchange out-of-band signaling messages to turn on the RTP header compression. Again, since the GTP header compression and the RTP header compression are independent of each other, it is not necessary for RTP header compression to be negotiated (in which case, the packets comprise a compressed GTP header and an uncompressed RTP payload.) Similarly, it is not necessary for GTP header compression to be negotiated notwithstanding the, use of RTP header compression.

Figure 9:
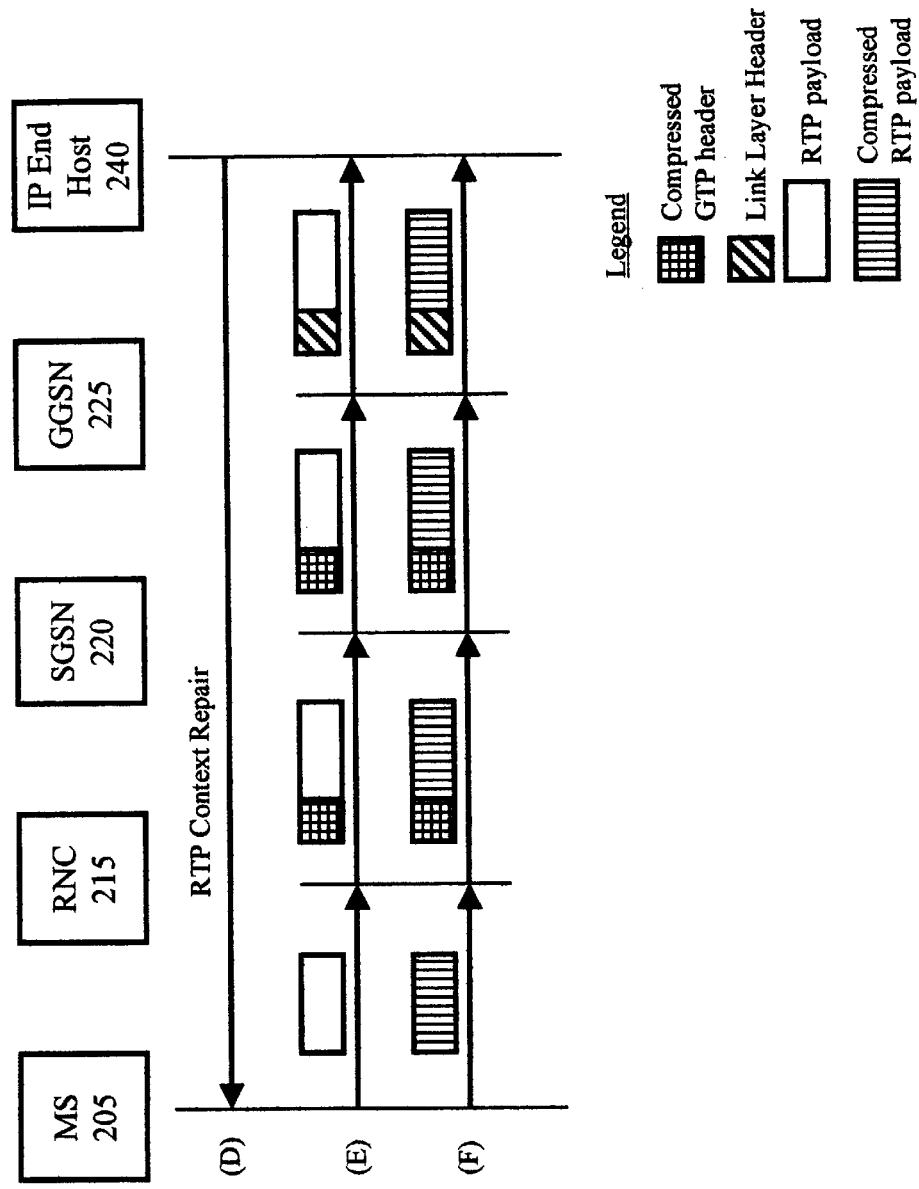

Returning to FIG. 7, once the RTP header compression context is set up, subsequent packets are sent using GTP header compression and RTP header compression (FIG. 7, (C)) (as noted, assuming both GTP header compression and RTP header compression are turned on). In the event RTP context re-synchronization is required, the receiving RTP peer can send a "RTP context repair" message to the sending RTP peer. This is illustrated in FIG. 9, (D), where the receiving RTP peer is represented by IP End Host 240 and the sending RTP peer is represented by MS 205. The sending RTP peer then sends one or more RTP packets with full header (FIG. 9, (E)) followed by compressed RTP packets (FIG. 9(F)).

Figure 10:
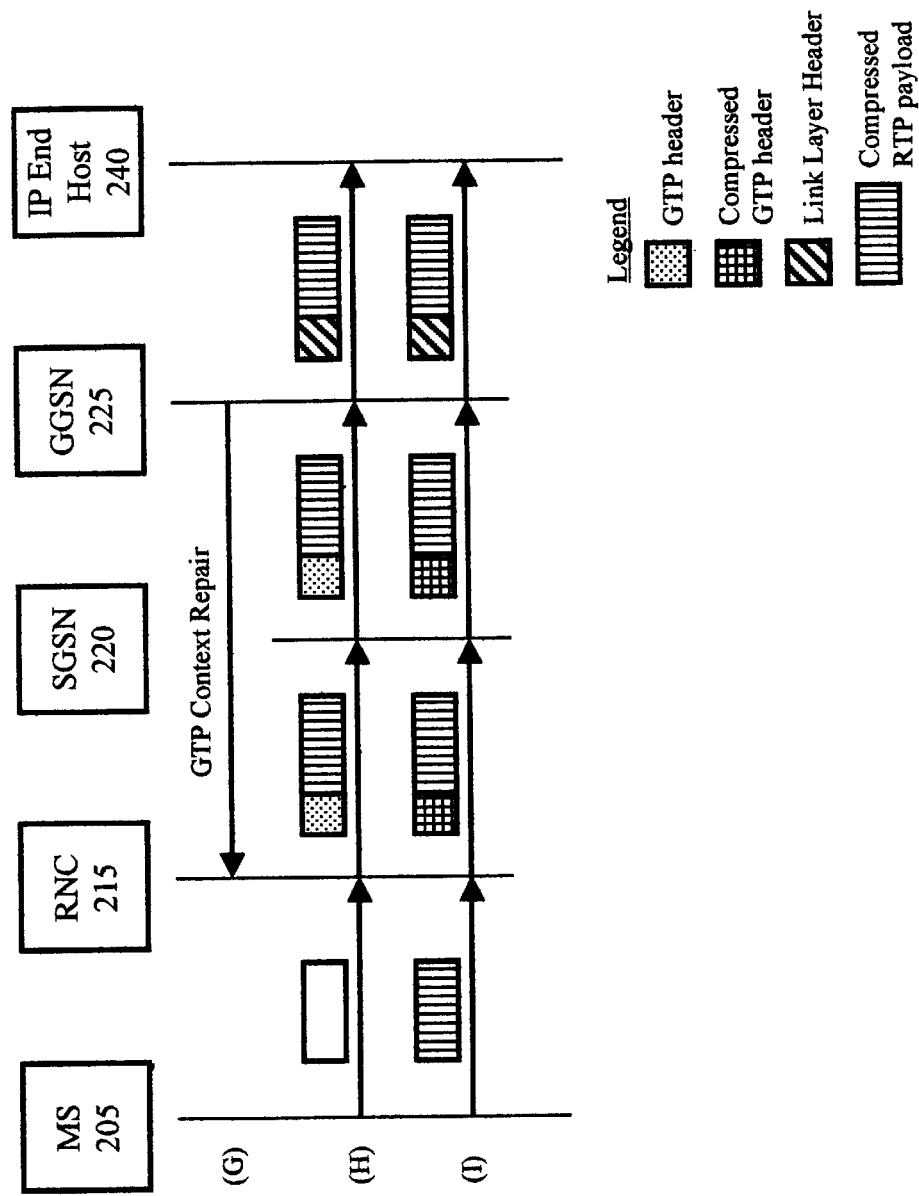

Similarly, when GTP packets are lost, the receiving GTP peer can send a "GTP context repair" message to the sending GTP peer. This is illustrated in FIG. 10, (G), where the receiving GTP peer is represented by GGSN 225 and the sending GTP peer is represented by RNC 215. The sending GTP peer then sends one or more packets with a full GTP header (FIG. 10, (H)) followed by packets with compressed GTP headers (FIG. 10, (I)). (It should be observed that in this example, RTP header compression synchronization was not lost.)

The above-described context repair mechanism for either GTP header compression or RTP header compression is performed whenever there are missing packets. It should be noted that one can set a predefined time interval threshold beyond which an explicit context repair message is sent to the sender to re-synchronize.

Whenever either GTP peer wishes to tear down the GTP context, they can send a GTP context tear down message (not shown). Similarly, the RTP peers can tear down the RTP context via the transmission of an RTP context tear down message (not shown).

RTP Header Compression

Figure 11:
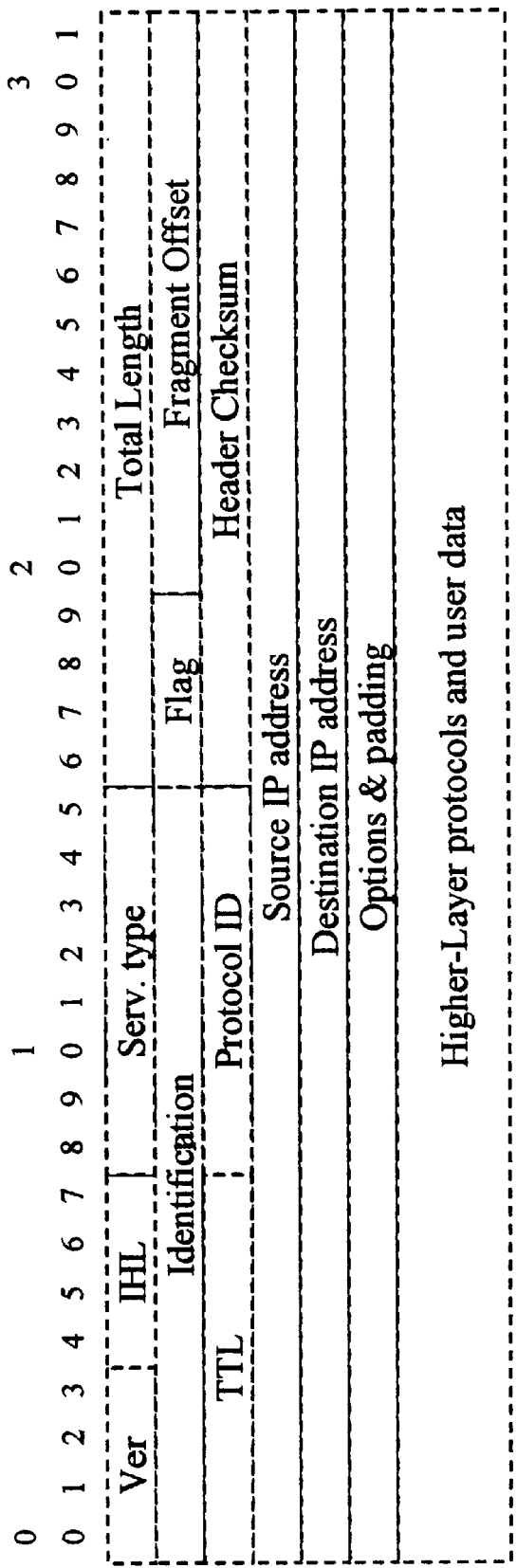
FIGS. 11–13 show prior art IP, UDP and RTP header formats.
Figure 12:
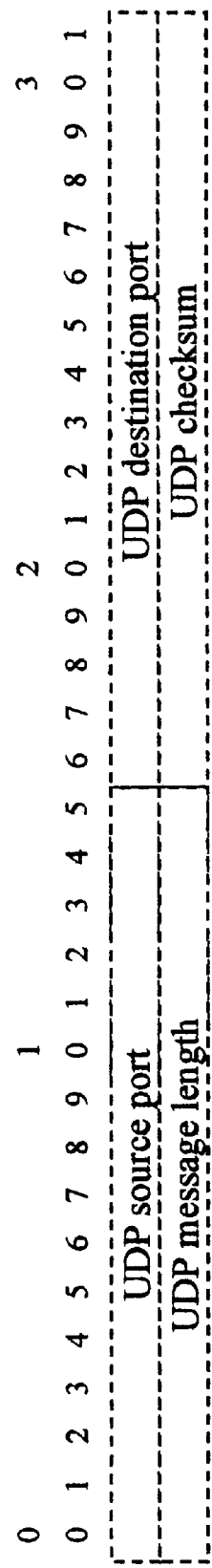

Although not directly applicable to a UMTS environment, there are existing proposals to reduce the 40-byte RTP/UDP/IP header to 4–5 bytes (e.g., see S. Casner and V. Jacobson, "Compressing IP/UDP/RTP Headers for Low-Speed Serial Links," IETF RFC2508; and L. Jonsson and M. Degermark and H. Hannu and K. Svanbro, "Robust Checksum-based Header Compression", IETF internet draft, October 1999). As such, while FIGS. 11–13 show prior art IP, RTP and UDP header formats for reference purposes, the details of such are not described herein.

Generally, with respect to an IP header (assuming use of IPv4, the IP version in use today), only the total length, packet ID (identification) and header checksum fields will normally change. However, the total length is redundant since the length is also provided by the link layer. The packet ID usually increments by one or a small number for each packet. If it was assumed that there was no EP packet fragmentation, this also would not need to be communicated. However, in order to maintain lossless compression, changes in the packet ID may be transmitted.

With respect to a UDP header, the length field is redundant since the IP total length field and the length are indicated by the link layer. The UDP check-sum field will be a constant zero if the source elects not to generate UDP checksums. Otherwise, I have observed that the UDP checksum must be communicated intact in order to preserve the lossless compression.

With respect to an RTP header, the SSRC (synchronization source) identifier is constant in a given context since that is part of what identifies the particular context. For most packets, only the sequence number and the timestamp will change from packet to packet. If packets are not lost or misordered upstream from the compressor, the sequence number will increment by one for each packet. For audio packets of constant duration, the timestamp will increment by the number of sample periods conveyed in each packet. For video, the timestamp will change on the first packet of each frame, but then stay constant for any additional packets in the frame. If each video frame occupies only one packet, but the video frames are generated at a constant rate, then again the change in the timestamp from frame to frame is constant. It should be noted that in each of these cases the second-order difference of the sequence number and timestamp fields is zero, so the next packet header can be constructed from the previous packet header by adding the first-order differences for these fields that are stored in the session context along with the previous uncompressed header. When the second-order difference is not zero, the magnitude of the change is usually much smaller than the full number of bits in the field, so the size can be reduced by encoding new first-order difference and transmitting it rather than the absolute value.

The M bit is set on the first packet of an audio talkspurt and the last packet of a video frame. If it were treated as a constant field such that each change required sending the full RTP header, this would reduce the efficiency of header compression significantly. Therefore, as described further below, an RTP compressed header will carry the M bit explicitly.

If the packets are flowing through an RTP mixer, most commonly for audio, then the CSRC list and CC count will also change. However, the CSRC list will typically remain constant during a talkspurt or longer, so it need be sent only when it changes.

Figure 14:
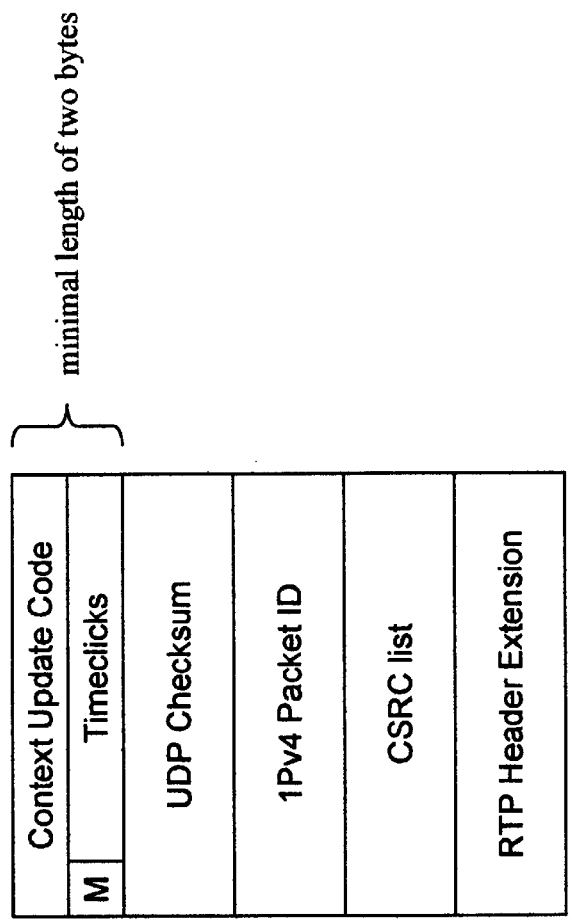
FIG. 14 shows an illustrative format for a compressed RTP header.

An illustrative format for a compressed RTP header is shown in FIG. 14 for use as part of the RTP header compression protocol. As noted above, it is assumed an RTP peer transmits the compressed RTP header and maintains a collection of shared information (e.g., stored in a memory (not shown) in a consistent state between the compressor and decompressor). The compressed RTP header comprises the following fields:

- a Context Update Code (one byte);
- an M field (one bit) for the RTP M bit;
- a time clicks field (seven bits);
- a UDP checksum field (two bytes);
- an IP packet ID (two bytes);
- a CSRC list (two bytes); and
- an RTP header extension (two bytes).

The value of the Context Update Code field indicates what information is included in the RTP compressed header as shown in FIG. 14. The minimal length for the RTP compressed header is 2 bytes. The RTP timestamps are replaced by a timeclick number (1 byte). If the UDP checksum, IPv4 Packet ID, CSRC list and RTP header extension need to be included, the compressed RTP header will be longer as shown in FIG. 14. However, most of the time, the compressed RTP header will only be 2 bytes (the context update code byte and the M+timeclick byte).

With respect to the shared information stored in each RTP peer, there is a separate session context for each IP/UDP/RTP packet stream, as defined by a particular combination of the IP source and destination addresses, UDP source and destination ports, and the RTP SSRC field (described earlier). The number of maintained session contexts may be negotiated between the compressor and decompressor. Once can map each RTP context to a GTP TID (GTP tunnel ID) (the maximum number that can be negotiated is 65536). Each RTP header compression context has its own separate sequence number space so that a single packet loss need only invalidate one context.

The shared information in each RTP header compression context comprises the following items:

- the full IP, UDP and RTP headers, possibly including a CSRC list, for the last packet sent by the compressor or reconstructed by the decompressor; and
- the first-order difference for the IPv4 ID field, initialized to 1 whenever an uncompressed IP header for this context is received and updated each time a delta IPv4 ID field is received in a compressed packet.

As mentioned above, and shown in FIG. 14, there is a timeclicks field in the compressed RTP header which replaces the RTP timestamps field of an RTP header (e.g., see FIG. 13). As such, a mechanism is required o compute, or recover, the timestamp value and sequence number in an RTP receiving peer from the timeclicks field value. As such, the following definitions are made:

- sd: sample duration (in ms),
- $TS_{old}$: timestamp number for the previous packet;
- $TS_{new}$: timestamp number for this packet;
- $WT_{old}$: wall clock reading for the previous packet (a wall clock is simply a network reference clock);
- $WT_{new}$: wall clock reading for this packet;
- $TN_{old}$: timeclick number of previous packet in compressed header;
- $TN_{new}$: timeclick number of this packet in compressed header;
- $SN_{old}$: RTP sequence number of previous packet;
- $SN_{new}$: RTP sequence number of this packet;
- T: time period represented using n bits (a cycle period), in units of sample duration, $T=2^n$ samples ($T=2^n$(sd) milliseconds (ms))
- M: the value of M bit in compressed header.

The following equations are used to compute, or recover, the timestamp value and sequence number in an RTP receiving peer from the timeclicks field value:

$$TS_{new} = TS_{old} + 1; \quad \text{if } M = 0 \text{ and } \delta_{tick} = 1; \text{ and} \quad (1)$$

$$= TS_{old} + (\delta_{cycle} * T + \delta_{tick}) \quad \text{otherwise;} \quad (2)$$

$$SN_{new} = SN_{old} + \delta_{tick}, \text{ if } \delta_{tick}!=1, \text{ and } \delta_{tick} < T/4 \text{ and } M!=1; \quad (3)$$

where $\delta_{tick} = (T + TN_{new} - TN_{old}) \mod T$, (where modT is a modulo T operation); \quad (6)

$\delta_{wtick} = (WT_{new} - WT_{old}) \mod T;$ \quad (7)

$\delta'_{cycle} = \lfloor (WT_{new} - WT_{old})/T \rfloor$; (where "$\lfloor \ \rfloor$" represent the "floor")

$\delta_{cycle} = \delta'_{cycle} - 1, \text{ if } \delta_{wtick} < \delta_{tick}, \text{ and } \delta_{tick} - \delta_{wtick} \geq T/2;$ \quad (7)

$= \delta'_{cycle} + 1, \text{ if } \delta_{wtick} < \delta_{wtick}, \text{ and } \delta_{wtick} - \delta_{tick} \geq T/2; \text{ and} \quad (8)$ $= \delta'_{cycle}, \quad \text{otherwise.} \quad (9)$ During a talkspurt, the timeclicks field value will increase by one sample. During a silent period, the timeclicks field will increase by the idle period (expressed in terms of the number of samples).

For the timestamp field, the major problem to solve is what to do for the case when the 7-bit timeclick number wraps around. During a silent period, if there is no packet sent by the compressor, the time elapse for the silent period must be detected (in terms of how many clock cycles has passed). Illustratively, a wall clock as known in the art is used to overcome this problem (as shown above, e.g., $WT_{old}$ and $WT_{new}$). This separate wall clock at the decompressor (or receiving RTP peer) is used to count the cycles. This wall-clock runs at a coarse granularity, e.g. it only increases by 1 for every T/4 period where T is the time period of a cycle represented using 7 bits.

With respect to the RTP sequence number field, if sequencing is required, a compressed header with sequence number should be included every T/4 samples and at the beginning of every talkspurt. A context repair message can be sent to request a fall RTP header if necessary. If the timeclick value exceeds T/4, and there are lost packets, the RTP sequence number can't be updated appropriately until the RTP receiver gets a packet with sequence number information.

An illustration of how this update algorithm works to provide timestamp and sequence number recovery is shown below. It is assumed that 18 packets are transmitted from, e.g., MS 205, with consecutive sequence numbers 1 to 18. At the RTP receiver, e.g., IP End Host 240, only packet 18 is received (i.e., packets 7 to 17 are lost).

In the first example, its is assumed that the wall clock value is 3 (meaning 3(T/4)) when packet with sequence number 6 is received and that $TS_{old}$=110. When packet 18 is received, the wall clock value is 6. The timeclicks value at receipt of packets 6 and 18 are 110 and 75, respectively. Using the equations above, the following calculations result, $TS_{old}=110$;

$\delta_{tick}=(128+75-110)modT=93$;

$\delta_{wtick}=(6(T/4)-3(T/4))modT=3(T/4)=96$;

$\delta'_{cycle}=\lfloor(6(T/4)-3(T/4))modT=3(T/4)=96$;

$\delta_{cycle}=0$; and $TS_{new}=110+93=203$.

In the following second example, it is assumed that $TS_{old}=38$ and that the wall clock value for packet 6 is 5, while the wall clock value for packet 18 is 9. The timeclicks value at receipt of packets 6 and 18 are 38 and 32, respectively.

$TS_{old}=38$;

$\delta_{tick}=(128+32-38)modT=122$;

$\delta_{wtick}=(9(T/4)-5(T/4))modT=0$;

$\delta'_{cycle}=\lfloor(9(T/4)-5(T/4))/T\rfloor=1$;

$\delta_{cycle}=0$; and $\delta TS_{new}=38+122=160$.

In the following third example, it is assumed that $TS_{old}=57$ and that the wall clock value for packet 6 is 6, while the wall clock value for packet 18 is 9. The timeclicks value at receipt of packets 6 and 18 are 57 and 28, respectively.

$TS_{old}=57$;

$\delta_{tick}=(128+28-57)modT=29$;

$\delta_{wtick}=(9(T/4)-6(T/4))modT=3(T/4)=96$;

$\delta'_{cycle}=\lfloor(9(T/4)-6(T/4))/T\rfloor=0$;

$\delta_{cycle}=1$; and $TS_{new}=57+122=214$.

GTP Header Compression

Figure 15:
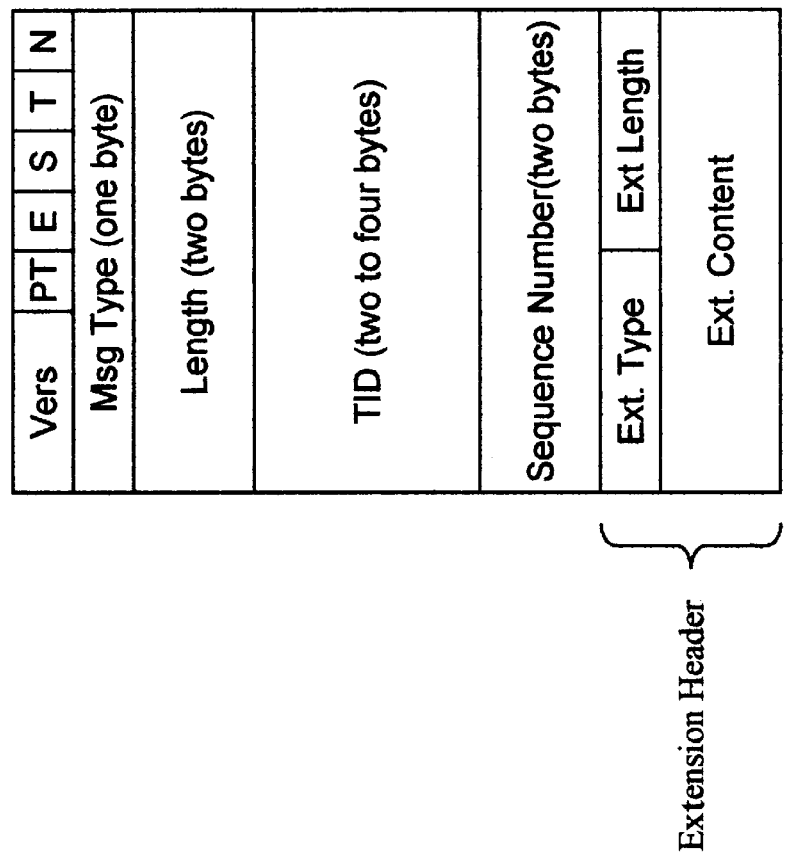
FIG. 15 shows an illustrative format for a compressed GTP header.

FIG. 15 shows an illustrative format for a compressed GTP header. The compressed GTP header comprises a version field (Vers, 3 bits), a payload type field (PT, 1 bit), an extension bit field (E, 1 bit), a sequence number field (S, 1 bit), a tunnel identifier (TID) present field (T, 1 bit), an SNDCP present field (N, 1 bit), a message type field (Msg Type, 1 byte), a two byte length field, a two to four byte tunnel identifier (TID) field, a two byte sequence number field, a four bit extension code filed, a four bit extension length field, and an extension content field.

With respect to the TID field, the most significant bit is used to indicate the size of the TID field. If the value of the most significant bit is 0, then the TID field size is 2 bytes. If the value of this bit is one, then the TID field size is four bytes. In addition, the TID field is present only if the value of the T bit field is SET, i.e., equal to a binary one. The E-bit field is used to indicate if an extension header exists. Each extension header comprises a 4 bit extension header type (Ext. Type) field, a 4 bit extension header length (Ext. length) field, and an extension content (Ext. Content) field (the size of which is indicated by the value of the extension header length field). The value of the extension header length field is expressed in terms of multiples of 2 bytes. For example, if a UDP checksum needs to be present, an appropriate extension header type is defined for this and the extension header length is 1 (meaning the size of the extension content field is 2 bytes since a UDP checksum is 2 bytes long).

Since the extension header type field is four bits wide, 16 types of extensions can be defined. Since the extension header length field is four bits wide, the extension content field has a maximum size of 32 bytes (i.e., 16 two byte multiples). It should be noted that if more extension types need to be allocated, the size of these fields can be adjusted, e.g., to a size of one byte each.

The shared information in each GTP header compression context (i.e., stored at each GTP peer) comprises the following items (these items are initialized based on the values received in the initial "full" GTP header):

the full EP and UDP headers (also, should a UDP checksum be required, the receiving GTP peer simply re-calculates it based upon the received UDP data);

the two byte flow label and the LLC Frame number; and the TID value.

As noted above, the GTP header compression format shown in FIG. 15 supports either two or four byte optional TID values. (As noted above, the 97 release version of a TID is 8 bytes. However, TID values may be redefined in the future to comprise fewer bytes (hence the option of having either TID values of two or four bytes in the compressed GTP header). The TID field in the GTP header compression format of FIG. 15 is optionally used (via the value of the T bit) for updating TID information.

Figure 16:
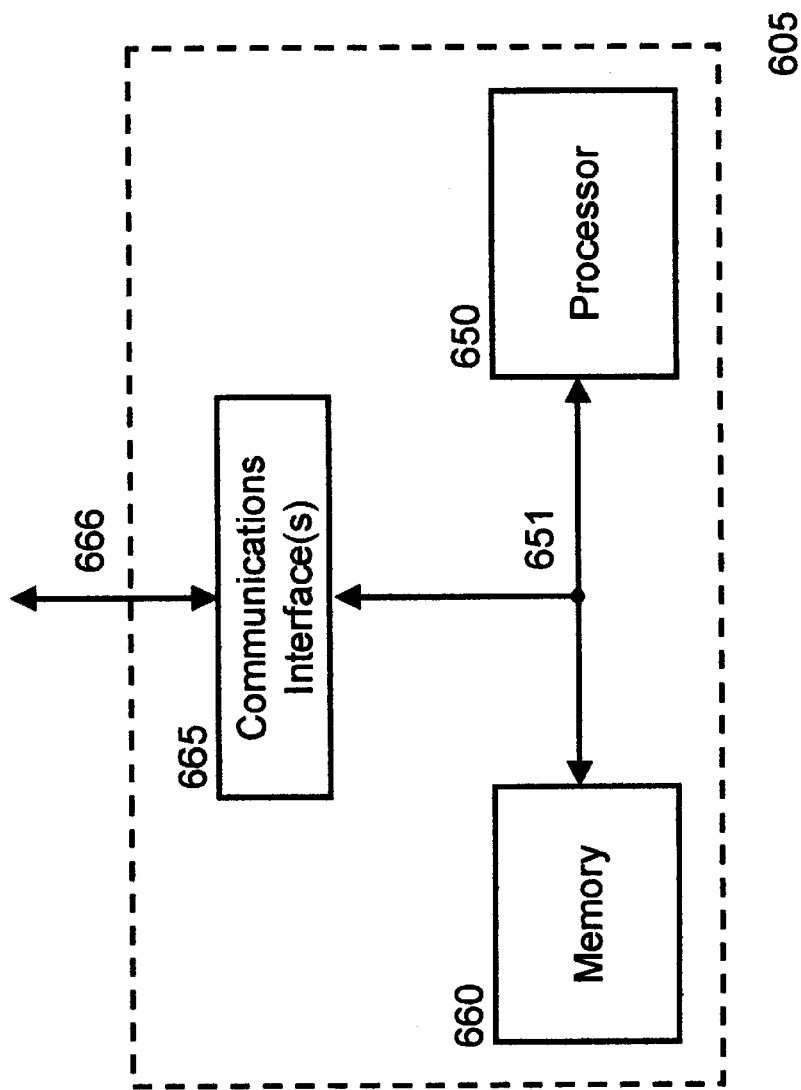
FIG. 16 shows an illustrative high-level block diagram of a packet server for use in performing GTP header compression in accordance with the principles of the invention.

Turning briefly to FIG. 16, a high-level block diagram of a representative packet server for use in accordance with the principles of the invention is shown. Packet server 605 is a stored-program-control based processor architecture and includes processor 650, memory 660 (for storing program instructions and data, e.g., for communicating in accordance with the above-mentioned GTP header compression, etc.) and communications interface(s) 665 for coupling to one or more packet communication facilities as represented by path 666.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of UMTS, the inventive concept is applicable to any wireless system (e.g., UMTS, etc.) or application that requires use of a tunneling protocol.

What is claimed:

1. A method for use in a packet server, the method comprising the steps of:

negotiating compression of a GTP/UDP/IP header of a General Packet Radio Service based Tunneling Protocol (GTP) with a GTP peer, the GTP/UDP/IP header comprising GTP, User Datagram Protocol (UDP), and Internet Protocol (IP) header information including initially transmitting the GTP/UDP/IP header to the GTP peer; and subsequently compressing the GTP/UDP/IP header before transmitting the packets;

wherein the compressed GTP/UDP/IP header comprises at least, an extension bit field, which indicates whether an extension field is present or not, a tunnel identifier present field, which indicates whether a tunnel identifier field is present or not.

2. The method of claim 1 wherein the compressed GTP/UDP/IP header comprises at least a tunnel identifier field that is less than or equal to four bytes in length.

3. The method of claim 1 further comprising the steps of:
formatting data packets in accordance a Real Time Protocol (RTP) also having UDP and IP header information; and
compressing the RTP/UDP/IP header before transmitting the packets wherein one field of the compressed RTP/UDP/IP header defines whether a UDP checksum field is present or not.

4. A method for use in a packet server, the method comprising the steps of:
negotiating compression of a GTP/UDP/IP header of a General Packet Radio Service based Tunneling Protocol (GTP) with a GTP peer, the GTP/UDP/IP header comprising GTP, User Datagram Protocol (UDP), and Internet Protocol (IP) header information; and
negotiating compression of an RTP/UDP/IP header of a Real Time Protocol (with an RTP peer, the RTP/UDP/IP header comprising RTP, UDP and IP header information;
wherein the GTP and RTP header compression are negotiated independently of one another and where GTP peer and the RTP peers may be different.

5. The method of claim 4 wherein the compressed GTP/UDP/IP header comprises at least a tunnel identifier field that is less than or equal to four bytes in length.

6. The method of claim 4 herein the compressed RTP/UDP/IP header comprises at least on field which defines whether a UDP checksum field is present or not.

7. A method for use in a packet system, the method comprising the steps of:
receiving a request message to compress a General Packet Radio Service based Tunneling Protocol (GTP) header from a packet server; and
responding to the packet server with a message acknowledging compression of the GTP header;
subsequent to receiving the request message transmitting a create packet data protocol (PDP) context request for compression of the GTP header to a different packet server, said request including a defined identifier; and
receiving a create PDP context acknowledgement from the different packet server, said acknowledgement including said identifier.

8. A method for use in a packet server, the method comprising the steps of:
negotiating compression of a GTP/UDP/IP header of a General Packet Radio Service based Tunneling Protocol (GTP) with a GTP peer, the GTP/UDP/IP header comprising GTP, User Datagram Protocol (UDP), and Internet Protocol (IP) header information including initially transmitting the GTP/UDP/IP header to the GTP peer; and
subsequently to said negotiating transmitting a compressed version of the GTP/UDP/IP header to the GTP peer.

9. The method of claim 8 wherein the compressed GTP/UDP/IP header comprises at least a tunnel identifier field that is less than or equal to four bytes in length.

10. The method of claim 8 wherein the compressed GTP/UDP/IP header comprises at least, an extension bit field, which indicates whether an extension field is present or not, a tunnel identifier present field, which indicates whether a tunnel identifier field is present or not.

11. The method of claim 8 further comprising the steps of:
formatting data packets in accordance a Real Time Protocol (RTP) also having UDP and IP header information; and
compressing the RTP/UDP/IP header before transmitting the packets wherein one field of the compressed RTP/UDP/IP header defines whether a UDP checksum field is present or not.

12. The method of claim 3, wherein a timeclicks field replaces an RTP timestamp field in the compressed RTP header.

13. The method of claim 8, wherein a timeclicks field replaces an RTP timestamp field in the compressed RTP header.

14. The method of claim 8, wherein further including transmitting a create packet data protocol (PDP) context request for compression of the GTP header to a different packet server, said request including a defined identifier; and
receiving a create PDP context acknowledgement from the different packet server, said acknowledgement including said identifier.

* * * * *